3,509,078
CROSS LINKED MACROPOROUS POLYMERS
Lubor Roubinek, London, and Arnold G. Wilson, Ealing,
London, England, assignors to The Permutit Company
Limited, London, England, a British company
No Drawing. Filed Aug. 19, 1966, Ser. No. 573,476
Claims priority, application Great Britain, Aug. 26, 1965,
36,727/65
Int. Cl. C08f 1/84, 47/08; C08j 1/28
U.S. Cl. 260—2.5                                    6 Claims

ABSTRACT OF THE DISCLOSURE

A process for the manufacture of a cross-linked porous polymer. A monomer having a single double bond is co-polymerized with a cross linking agent having two double bonds. The reaction is carried out in the presence of a polymer and the polymer is subsequently removed from the copolymer product. A macroporous copolymer product, having pores in the general size range of from 500–1000 A. is produced and only a small amount of cross linker and solvent is necessary.

---

This invention relates to the manufacture of cross-linked porous polymers by copolymerising a mixture of one or more monomers having a single polymerisable double bond with a cross-linking agent having two or more polymerisable double bonds. Well known examples of such monomers are styrene and divinylbenzene, the resultant copolymers being used as intermediates in the production of ion-exchange resins and for other purposes.

It is known that if the monomers are mixed with an inert organic liquid in which the resultant polymer is insoluble, and there is a substantial proportion of the cross-linking agent in the mixture, the pores are larger than when the process is carried on in the absence of such an organic liquid. A disadvantage of this process is the substantial proportion of both the cross-linking agent and the organic liquid which must be used to produce a satisfactory product with pores in the general size range of from 500 to 1000 Angstroms.

The invention is based on the discovery that certain polymeric substances can replace the usual organic liquids with considerable advantage. We find that an equivalent porous structure can be obtained with much less cross-linking agent than hitherto, or that the proportion of the monomers in the mixture can be higher than hitherto. The polymeric substance in question must be completely soluble in (or miscible with) the monomer mixture to yield a single phase, and must be incompatible with or insoluble in the resultant copolymer in the sense that neither will dissolve in the other, but rather that they will form two phases. The polymeric substance may be either solid or liquid, and in either case the mixture of monomers and polymeric substance forms a single-phase solution. In the course of the polymerisation the polymeric substance, which takes no part in the reaction, separates out in either liquid or solid form to become a separate phase in the desired copolymer. In contrast to the organic liquids hitherto used, such as white spirit which is subsequently removed by evaporation, usually assisted by heat, the polymeric substance contained in the copolymer must be removed from it by solvent action.

The monomer or monomers containing one polymerisable double bond may be, for example, methyl methacrylate, methyl acrylate, ethyl acrylate, styrene, acrylonitrile, or vinyl acetate.

Suitable cross-linking agents are, for example, divinyl benzene (DVB), ethylene glycol dimethacrylate, divinyl ketone, vinyl methacrylate and divinyl oxalate.

Examples of suitable polymeric substances are polyethylene glycols; polypropylene glycols; mixed poly(ethylene-propylene) glycols of various molecular weights; condensation products of any of these glycols with mono- or polyamines; polycarboxylic acids or diisocyanates; polyvinyl alkyl ethers in which the alkyl group is a lower alkyl group such as methyl or ethyl; certain synthetic waxes such as those sold under the trademark "Hoechst Waxes"; polyisobutylene; polyethylene; and chlorosulphonated polyethylene.

The cross-linking agent may amount to no more than 0.5% of the mixture of monomers by weight, and although it may amount to as much as 40%, excellent products are obtained in the range of 0.5 to 15%.

The proportion of the polymeric substance may be from 5 to 40% by weight of the total mixture, but again excellent results are obtained if it is no more than 15%.

Examples of solvents that may be used to dissolve and remove the polymeric substance from the desired copolymers are toluene in the case of polyethylene, and water or benzene in the case of polyethylene glycols or polyvinyl alkyl ethers.

The polymerisation is carried out in the usual way the aid of heat and a catalyst. Any of the commonly used polymerisation catalysts may be employed, for example a free-radical-producing catalyst such as benzoyl or lauryl peroxide, or azo-bis-isobutyronitrile.

The degree of porosity of the copolymer produced depends both on the proportion of cross-linking agent in the monomer mixture and on the proportion of polymeric substance present in the monomers. In any class of polymeric substances, such as for example the polyethylene glycols, the members of higher molecular weight are found to be more effective in promoting porosity, weight for weight, than are those of lower molecular weight, and therefore the proportion of polymeric substance required is reduced as its molecular weight is increased.

The polymerisation can be carried out in various ways depending on the desired form of the copolymer to be produced. For example, insulation material can be produced with the techniques of bulk polymerisation, and sheet material can be made in the same way by containing the polymerising mixture in a suitably shaped mould. Suspension polymerisation techniques can be used when it is desired to obtain the product in the form of beads or pearls.

The invention is particularly useful in the manufacture of intermediates in bead form for the production of macroporous ion-exchange resins. Thus copolymers of styrene and divinyl benzene can be chloromethylated and aminated to yield macroporous anion-exchange resins or sulphonated to yield macroporous strongly acidic, cation-exchange resins. Copolymers of ethyl acrylate and divinyl benzene or of acrylonitrile and divinyl benzene can be hydrolysed to yield macroporous, weakly acidic cation-exchange resins.

The resultant copolymer will possess ion-exchange groups if the monomers are appropriately chosen, for example are methacrylic acid and divinyl benzene, and will not simply be an intermediate.

Some examples will now be given.

EXAMPLE 1

A solution of styrene (7.96 ml.), technical divinyl-benzene (1.04 ml., containing 51.0 percent divinyl benzene), benzoyl peroxide (0.04 gm.) and polyvinyl ethyl ether (1 ml.) was heated in a sealed glass tube at 80° C. for 20 hours. The hazy polymeric product was broken down into granules and the polyvinyl ethyl ether removed from it by repeated extraction with warm benzene. The copolymer was then dried at 80° C. for 16 hours. It will be seen that the cross-linking agent amounted to about 6% of the monomer mixture and the polymeric substance to about 10% by volume of the total mixture.

EXAMPLE 2

A solution of styrene (249.2 ml.), technical divinyl benzene (20.8 ml. containing 51.0 percent divinyl benzene), benzoyl peroxide (1.2 gm.) and polyethylene glycol of molecular weight 20,000 (41.7 gm. equivalent to 33 ml.) was added to an agitated solution of sodium chloride (300 gm.) and polyvinyl alcohol (10 gm.) in water (1000 gm.). The organic phase was dispersed in the form of fine droplets and polymerisation was carried out by heating at 80–85° C. for 8 hours. The resulting polymer beads were filtered and washed with water. The white opaque polymer, in the form of spherical particles, was dried at 80° C. for 16 hours. The polyethylene glycol was removed from the beads by repeated extraction with warm benzene and the product re-dried at 80° C. It will be seen that the cross-linking substances amounted to about 4% of the monomer mixture and the polymeric substance to about 11% of the total mixture by volume.

EXAMPLE 3

A solution of ethyl acrylate (188 ml.), styrene (18.1 ml.), technical divinylbenzene concentrate (11.3 ml. containing 51.0 percent divinylbenzene), benzoyl peroxide (1 gm.) and a block-copolymer of polyoxyethylene with polyoxypropylene, sold under the trade mark Pluronic L64 (29.6 ml.) was added to an agitated solution of sodium chloride (100 gm.) and gelatine (10 gm.) in water (1000 ml.). The organic phase was dispersed in the form of fine droplets, and polymerisation was carried out by heating at 75° C. for 6 hours. The resulting opaque polymer in bead form was filtered and washed with warm water. It was then hydrolysed for 16 hours at 80° C. with excess 20% sodium hydroxide solution to produce a weakly-acidic resin in bead form. The polymeric substance (the block-copolymer) was dissolved and removed in the course of the washing and hydrolysis.

It will be seen that the cross-linking agent amounted to about 2.6% of the monomer mixture and the polymeric substance to about 12% by volume of the total mixture.

EXAMPLE 4

A solution of ethyl acrylate (199 ml.), technical divinylbenzene concentrate (11.5 ml. containing 51.0 percent DVB), α,α'-azodiisobutyronitrile (0.4 gm.) and a polyoxypropylene condensate, sold under the trade mark Niax LHT–28 (16 ml.) was added to an agitated solution of sodium chloride (100 gm.) and hydroxyethyl cellulose of medium viscosity, sold under the trade mark Natrosol 250M (3 gm.) in water (1000 ml.). The organic phase was dispersed in the form of fine droplets, and polymerisation was carried out by heating at 75° C. for 19 hours. The resulting polymer beads were filtered and washed with water. These beads tended to stick together and magnesium carbonate powder (2 gm.) was thoroughly mixed with them. The mixture was dried at 80° C. for 16 hours. The dry polymer was then sulphonated to produce a mixed-acid cation-exchange resin. The polymeric substance (the polyoxypropylene condensate) was dissolved and removed in the course of the washing and sulphonation.

It will be seen that the cross-linking agent (DVB) amounted to about 2.8% of the monomer mixture and the polymeric substance to about 7.1% by volume of the total mixture.

EXAMPLE 5

A solution of acrylonitrile (100 ml.), methacrylic acid (16.4 ml.), technical divinylbenzene concentrate (33.3 ml. containing 51.0 percent divinylbenzene), α,α'-azodiisobutyronitrile (0.75 gm.) and polyethylene glycol of molecular weight 20,000 (11 gm.=8.7 ml.) was added to an agitated solution of sodium chloride (300 gm.) and hyroxyethyl cellulose of medium viscosity, sold under the trade mark Natrosol 250M (3 gm.) in water (1000 ml.). The organic phase was dispersed in the form of fine droplets and polymerised by heating at 66–67° C. for 4 hours and at 80–85° C. for 2 hours. The white opaque polymer was filtered and washed with hot water. It was then hydrolysed for 16 hours at 100° C. with 20% sodium hydroxide solution to produce a weakly acidic ion-exchange resin in bead form. The polymeric substance (the polyethylene glycol) was dissolved and removed in the course of the washing and hydrolysis.

It will be seen that the cross-linking agent (DVB) amounted to about 11.5% of the monomer mixture and the polymeric substance to about 5.5% by volume of the total mixture.

EXAMPLE 6

A solution of methacrylic acid (148 ml.), technical divinylbenzene concentrate (12 ml. containing 60% DVB), benzoyl peroxide (2 gm.) and polyethylene glycol of molecular weight about 20,000 (50 gm.) was added to a stirred solution of hydroxyethyl cellulose (3 gm.) and sodium chloride (350 gm.) in water (1000 ml.) so as to form the organic phase into droplets. Stirring was continued for 6 hours, the temperature being maintained at 80° C. during this period. The resulting opaque polymer beads, consisting of cross-linked methacrylic acid having cation-exchange properties were separated on a screen, washed with water and then extracted in a Soxhlet apparatus with hot water to remove the polyethylene glycol.

What is claimed is:

1. In a process of manufacturing a macroporous cross-linked copolymer having pores in the general size range of from 500 to 1000 Angstroms wherein at least one monomer having a single polymerizable double bond is polymerized with a cross linking agent having at least two polymerizable double bonds in the presence of an inert organic material which is inert with respect to the copolymerization reaction, which is completely soluble in or miscible with the monomer mixture to yield a single phase, and which will not dissolve in or be dissolved by the resultant copolymer, and wherein after polymerization has been effected, the inert organic material is removed from the resultant copolymer to provide said macroporous, cross-linked polymer, the improvement wherein said inert organic material is a polymeric substance selected from the group consisting of polyethylene glycol, polypropylene glycol, mixed polyethylene-polypropylene glycol, condensation products of said glycols with monoamines, polyamines, polycarboxylic acids or diisocyanates, polyvinyl (lower) alkyl ethers, polyisobutylene, polyethylene, and chlorosulfonated polyethylene, said polymeric substance being present in an amount of from 5 to 40% by weight of the total mixture, wherein said cross-linking agent is present in an amount of from 0.5 to 15% of the mixture of monomers, and wherein the polymeric substance is removed from the resultant copolymer by solvent action.

2. A process according to claim 1 wherein the monomer is selected from the group consisting of methyl methacrylate, methyl acrylate, ethyl acrylate, styrene, acrylonitrile, and vinyl acetate.

3. A process according to claim 2 wherein the cross linking agent is selected from the group consisting of divinyl benzene, ethylene glycol dimethacrylate, divinyl ketone, vinyl methacrylate, and divinyl oxalate.

4. A process according to claim 3 wherein the monomer is styrene and the cross linking agent is divinyl benzene.

5. A process according to claim 3 wherein the polymeric substance is polyethylene glycol.

6. A process according to claim 3 wherein the polymeric substance is a polyvinyl alkyl ether.

References Cited

UNITED STATES PATENTS

| | | |
|---|---|---|
| 2,160,054 | 5/1939 | Bauer et al. |
| 2,806,256 | 9/1957 | Smith-Johannsen. |
| 2,878,194 | 3/1959 | Rubens. |
| 3,275,548 | 9/1966 | Walters. |

FOREIGN PATENTS

| | | |
|---|---|---|
| 110,767 | 4/1961 | Pakistan. |

MURRAY TILLMAN, Primary Examiner

K. E. KUFFNER, Assistant Examiner

U.S. Cl. X.R.

260—2.1, 2.2, 28.5, 31.2, 874, 898, 901